(12) United States Patent
Sellars et al.

(10) Patent No.: US 11,452,974 B2
(45) Date of Patent: Sep. 27, 2022

(54) UNIT FOR PASSIVE TRANSFER OF CO2 FROM FLUE GAS OR AMBIENT AIR

(71) Applicant: Honda Motor Co., Ltd., Tokyo (JP)

(72) Inventors: Daniel T. Sellars, West Liberty, OH (US); Joel W. Agner, Bluffton, OH (US)

(73) Assignee: Honda Motor Co., Ltd., Tokyo (JP)

(*) Notice: Subject to any disclaimer, the term of this patent is extended or adjusted under 35 U.S.C. 154(b) by 216 days.

(21) Appl. No.: 16/906,168

(22) Filed: Jun. 19, 2020

(65) Prior Publication Data
US 2021/0394131 A1  Dec. 23, 2021

(51) Int. Cl.
*B01F 3/04* (2006.01)
*B01F 23/231* (2022.01)
(Continued)

(52) U.S. Cl.
CPC ...... *B01F 23/23124* (2022.01); *B01F 35/712* (2022.01); *B01F 35/7173* (2022.01); *B01F 35/75415* (2022.01); *B01F 23/2373* (2022.01); *B01F 23/23113* (2022.01); *B01F 23/23123* (2022.01); *B01F 23/23762* (2022.01); *B01F 23/231153* (2022.01); *B01F 23/231264* (2022.01)

(58) Field of Classification Search
CPC .. B01D 53/1475; B01D 53/18; B01D 53/185; B01F 23/23124; B01F 23/23762; B01F 23/2373; B01F 23/23123; B01F 23/231264; B01F 23/231153; B01F 23/23113; B01F 35/712; B01F 35/7173; B01F 35/75415

USPC .................................. 261/106, 107
See application file for complete search history.

(56) References Cited

U.S. PATENT DOCUMENTS 833,686 A * 10/1906 Hart .......................... F24F 6/04
                                                            261/106
968,370 A * 8/1910 Lea ........................ B01D 46/58
                                                            261/106

(Continued)

FOREIGN PATENT DOCUMENTS

CA      3013762 A1     8/2017
CN    106334418 A      1/2017

(Continued)

OTHER PUBLICATIONS

Espacenet Machine Translation of CN Patent No. 106334418 A, Jan. 2017.

(Continued)

*Primary Examiner* — Charles S Bushey
(74) *Attorney, Agent, or Firm* — Plumsea Law Group, LLC

(57) ABSTRACT

A passive gas exchange transfer apparatus for exchanging carbon dioxide from a flue gas to a water supply is disclosed. The apparatus includes several upper rods and several lower rods to hold a membrane in place. The membrane provides increased surface area for the gas and the water to meet. The upper rods may be the source of the water supply, and the lower rods may be the source of the gas. The upper rods may disperse the water onto one side of the membrane, and the lower rods may disperse the gas onto the other side. The two may therefore meet at the surface created by the membrane as gravity draws the water downward, and convection draws the gas upward.

20 Claims, 6 Drawing Sheets

(51) Int. Cl.
  *B01F 35/71* (2022.01)
  *B01F 35/75* (2022.01)
  *B01F 23/2373* (2022.01)
  *B01F 23/237* (2022.01)

(56) References Cited

U.S. PATENT DOCUMENTS

| | | | | |
|---|---|---|---|---|
| 1,011,244 | A * | 12/1911 | Puddington | F24F 6/04 261/107 |
| 2,042,289 | A * | 5/1936 | Baldwin | F24F 6/04 261/106 |
| 2,092,810 | A * | 9/1937 | McLean | C10J 1/10 261/106 |
| 3,211,380 | A * | 10/1965 | Skerritt | F24D 5/00 261/106 |
| 3,512,763 | A * | 5/1970 | Winton | F24F 6/04 261/106 |
| 3,515,378 | A * | 6/1970 | Hill | F24F 3/14 261/106 |
| 3,913,667 | A * | 10/1975 | Meylan | F28D 3/00 261/DIG. 11 |
| 4,775,499 | A * | 10/1988 | Hongo | B01D 53/18 261/106 |
| 5,174,928 | A * | 12/1992 | Cheng | B01J 10/02 261/153 |
| 6,648,949 | B1 | 11/2003 | Der et al. | |
| 6,667,171 | B2 | 12/2003 | Bayless et al. | |
| 7,828,880 | B2 | 11/2010 | Moriya et al. | |
| 8,852,319 | B2 | 10/2014 | Wijmans et al. | |
| 9,084,961 | B2 | 7/2015 | Tsujiuchi et al. | |
| 9,101,093 | B2 | 8/2015 | Chance et al. | |
| 9,908,777 | B2 * | 3/2018 | Bayless | C01B 32/00 |
| 10,065,149 | B2 | 9/2018 | Tanaka et al. | |
| 2011/0174156 | A1 | 7/2011 | Saunders et al. | |
| 2013/0180166 | A1 | 7/2013 | Bayless et al. | |

FOREIGN PATENT DOCUMENTS

| | | |
|---|---|---|
| CN | 107744719 A | 3/2018 |
| WO | 2010037109 A2 | 4/2010 |
| WO | 2012077747 A1 | 6/2012 |
| WO | 2015115276 A1 | 8/2015 |

OTHER PUBLICATIONS

Espacenet Machine Translation of CN Patent No. 107744719 A, Mar. 2018.

* cited by examiner

UNIT FOR PASSIVE TRANSFER OF CO2 FROM FLUE GAS OR AMBIENT AIR

TECHNICAL FIELD

The present disclosure relates to the field of equipment for mass transfer exchange between a gas and a liquid. In particular, this disclosure relates to gas exchange apparatuses for enriching carbon dioxide levels of water.

BACKGROUND

Many attempts have been made to cost-effectively transfer carbon dioxide into water, for use in applications such as algal growth systems or for carbon sequestration and disposal by other means. Most of these technologies unfortunately rely on energy consuming equipment such as pumps, blowers, or other mechanical devices. Such equipment may be used to increase the water's exposure to air, or another gas, with the intended purpose of achieving faster or more efficient transfer of carbon dioxide from the gas into the water.

However, the use of power consuming devices to increase such exposure nonetheless may result in minimal net carbon benefit once the carbon dioxide generated by the power consuming devices are considered. Additionally, other attempts to improve the transfer of carbon dioxide into water may require large processing areas to achieve sufficient surface area contact between the carbon dioxide containing gas and the water.

Accordingly, there is a need in the art for improved equipment that can efficiently sequester carbon dioxide into water while incurring minimal additional carbon release.

SUMMARY

In one aspect, this disclosure provides a gas exchange apparatus, comprising: an upper liquid inlet, connected to a plurality of water feed rods located in an upper area of an internal chamber of the apparatus; a lower gas inlet, connected to a gas feed mechanism located in a lower area of an internal chamber of the apparatus; a porous membrane separating a top side of the internal chamber of the apparatus from a bottom side of the internal chamber of the apparatus; wherein the plurality of water feed rods are located vertically above the gas feed mechanism and vertically above the plurality of lower rods; and wherein the porous membrane extends over each of the plurality of water feed rods and under each of a plurality of lower rods in an alternating pattern, such that each water feed rod is located on the bottom side of the internal chamber of the apparatus and each lower rod is located on the top side of the internal chamber of the apparatus.

In another aspect, this disclosure provides a gas exchange apparatus comprising: an upper liquid inlet, connected to a plurality of water feed rods located in an upper area of an internal chamber of the apparatus; a lower gas inlet, connected to a plurality of gas feed rods located in a lower area of the internal chamber of the apparatus; a porous membrane separating a top side of the internal chamber of the apparatus from a bottom side of the internal chamber of the apparatus; a lower liquid outlet, configured to allow a liquid to exit from the lower area of the internal chamber of the apparatus; and an upper gas outlet, configured to allow a gas to exit from the upper area of the internal chamber of the apparatus; wherein the porous membrane extends over each of the plurality of water feed rods and under each of the plurality of gas feed rods in an alternating pattern, such that each water feed rod is located on the bottom side of the internal chamber of the apparatus and each gas feed rod is located on the top side of the internal chamber of the apparatus; each of the plurality of water feed rods includes a water outlet on an upper side of the water feed rod, the water outlet being configured to disperse a liquid onto an upper surface of the porous membrane; and each of the plurality of gas feed rods includes a gas outlet on a lower side of the gas feed rod, the gas outlet being configured to disperse a gas onto a lower surface of the porous membrane.

In still another aspect, a method of exchanging carbon dioxide from a flue gas to a water supply using a gas exchange apparatus is provided, the method comprising: receiving a flue gas into the gas exchange apparatus through a lower gas inlet; receiving a water supply into the gas exchange apparatus through an upper liquid inlet; routing the water from the upper liquid inlet to a plurality of water feed rods located in an upper area of an internal chamber of the gas exchange apparatus; routing the flue gas from the lower gas inlet to a plurality of gas feed rods located in a lower area of the internal chamber of the gas exchange apparatus; dispersing the flue gas from the plurality of gas feed rods onto a lower surface of a porous membrane; dispersing the water from the plurality of water feed rods onto an upper surface of the porous membrane; and wherein the porous membrane extends over each of the plurality of water feed rods and under each of the plurality of gas feed rods in an alternating pattern so as to divide the internal chamber into a top side and a bottom side.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Apparatuses and methods for exchanging carbon dioxide into water are described herein. According to the techniques of the example embodiments, the apparatus may be used to sequester carbon dioxide from a carbon rich flue gas into water at low cost and with high efficiency.

Generally, as used herein, a gas exchange apparatus may refer to any piece of equipment that aids in the movement of gas molecules into a liquid. As is generally known, gas exchange is the physical process by which gases move passively by diffusion across a surface. For example, this surface might be the air/water interface of a water body, the surface of a gas bubble in a liquid, a gas-permeable membrane, or a biological membrane that forms the boundary between an organism and its extracellular environment.

Broadly, a gas exchange apparatus in accordance with this disclosure may enable transfer of carbon dioxide from a relatively carbon rich gas to a water supply, thereby sequestering the carbon dioxide for use in applications such as an algal growth system. The relatively carbon rich gas may be a flue gas, generated by a power generating combustion process. The gas exchange apparatus may operate in such a way that the carbon dioxide sequestration is net carbon negative, even after including any carbon dioxide generated by the gas exchange apparatus and related processes. In this way, the gas exchange apparatus may generate carbon offsets that enable a larger manufacturing process or power generation process to approach overall net carbon neutrality.

Figure 1:
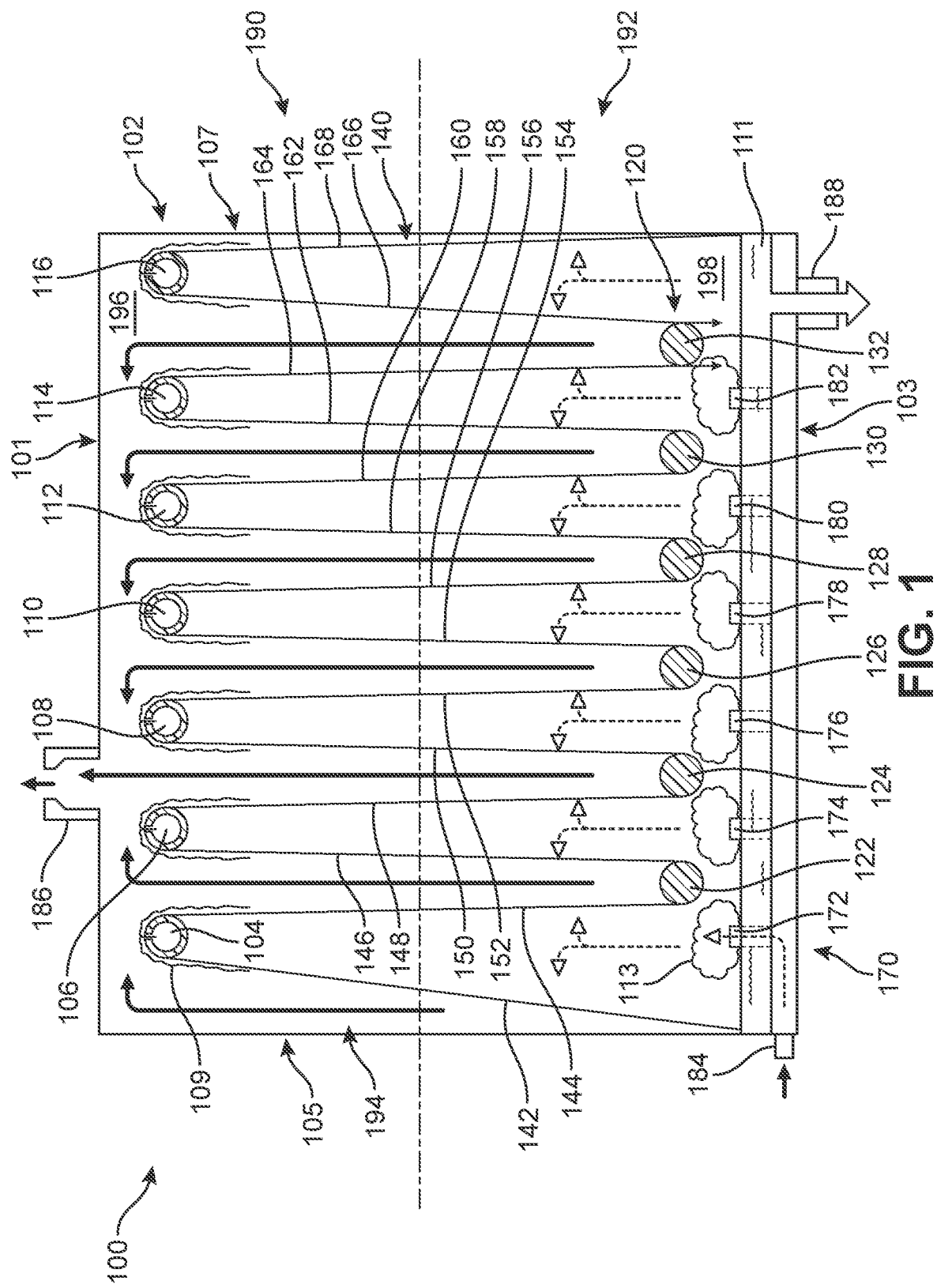
FIG. 1 is a cross-sectional diagram of a first embodiment of a gas exchange apparatus in accordance with this disclosure.

FIG. 1 shows a first embodiment of a gas exchange apparatus 100 in accordance with this disclosure. Gas exchange apparatus 100 may broadly include a plurality of upper rods 102, a plurality of lower rods 120, and a porous membrane 140 separating the two sets of rods. In an example embodiment, plurality of upper rods 102 may be water feed rods that allow a liquid 109 to be dispersed therefrom. The plurality of water feed rods 102 may be located in an upper area 190 of an internal chamber of apparatus 100.

The plurality of lower rods 120 may be located in a lower area 192 of an internal chamber of apparatus 100. Lower area 192 may generally be located vertically below upper area 190, as shown in FIG. 1. That is, upper area 190 may generally be adjacent to (and encompass) an upper side 101 of apparatus 100—and lower area 192 may generally be adjacent to (and encompass) a lower side 103 of apparatus 100. In this way, generally, the plurality of water feed rods 102 may be located vertically above the plurality of lower rods 120.

Lower area 192 of an internal chamber 194 of apparatus 100 may also include a lower gas inlet 184 connected to a gas feed mechanism 170. The lower gas inlet 184 may allow a gas, such as a flue gas from a combustion process, to enter into apparatus 100. In other embodiments, the gas may be air, or another gas containing carbon dioxide. Gas feed mechanism 170 may then include a plurality of gas outlets (172, 174, 176, 178, 180, 182) configured to route the gas from lower gas inlet 184 to various points in apparatus 100 so that the gas may be evenly dispersed therein.

In some embodiments, porous membrane 140 may extend over each of the plurality of upper water feed rods 102 and under each of the plurality of lower rods 120 in an alternating pattern. Namely, membrane 140 may extend vertically upward at membrane portion 142 and over a first water feed rod 104 of plurality of water feed rods 102. Membrane 140 may then extend downward at a membrane portion 144 and under a first lower rod 122 of plurality of lower rods 120. Membrane 140 may then extend back upwards at a membrane portion 146 and over a second water feed rod 106 of plurality of water feed rods 102, then back down at a membrane portion 148 and under a second lower rod 124 of plurality of lower rods 120.

This alternating pattern may then repeat for each set of water feed rod and lower rod. Namely, membrane 140 may continue upward at a membrane portion 150, over a third water feed rod 108 of plurality of water feed rods 102, downward at a membrane portion 152, under a third lower rod 126 of plurality of lower rods 120, upward at a membrane portion 154, over a fourth water feed rod 110 of plurality of water feed rods 102, downward at a membrane portion 156, under a fourth lower rod 128 of plurality of lower rods 120, upward at a membrane portion 158, over a fifth water feed rod 112 of plurality of water feed rods 102, downward at a membrane portion 160, under a fifth lower rod 130 of plurality of lower rods 120, upward at a membrane portion 162, over a sixth water feed rod 114 of plurality of water feed rods 102, downward at a membrane portion 164, under a sixth lower rod 132 of plurality of lower rods 120, upward at a membrane portion 166, over a seventh water feed rod 116 of plurality of water feed rods 102, then finally downward again at a membrane portion 168.

Generally, an apparatus in accordance with this disclosure may include a plurality of water feed rods 102 and a plurality of lower rods 120. The number of water feed rods 102 and lower rods 120 shown in FIG. 1 is merely exemplary.

As a result of this alternating pattern, membrane 140 may separate a top side 196 of the internal chamber 194 of apparatus 100 from a bottom side 198. It should be noted that top side 196 of internal chamber 194 includes upper side 101 of apparatus 100, but does not include water feed rods 102. Since membrane 140 extends over each of the plurality of water feed rods 102, the water feed rods 102 are on the bottom side 198 of internal chamber 194 as separated by membrane 140. Similarly, since membrane 140 extends under each of the plurality of lower rods 120, the lower rods 120 are on the top side 196 of internal chamber 194 as separated by membrane 140.

As a result of this configuration, a large surface area of membrane 140 is located between where a gas 113 is dispersed by gas feed mechanism 170 and where a liquid 109 is dispersed by plurality of water feed rods 102. Namely, each membrane portion 142, 144, 146, 148, 150, 152, 154, 156, 158, 160, 162, 164, 166, 168 is aligned diagonally between a water feed rod (such as first water feed rod 104) and a laterally adjacent lower rod (such as first lower rod 122) or a wall on the sides of internal chamber 194, including a first wall 105 and an opposite second wall 107. This configuration allows these diagonal membrane portions to extend vertically along most of the height of apparatus 100. The increased surface area of membrane 140 provided by this configuration allows the gas and water to meet, in order to transfer carbon dioxide from the gas to the water.

Namely, a liquid 109, such as water, may be dispersed by plurality of water feed rods 102 that are located in the upper area 190—and also are located vertically above gas feed mechanism 170. Gas 113 may then be dispersed by gas feed mechanism 170 that is located in the lower area 192. Liquid 109 may be dispersed through membrane 140 onto an upper surface of membrane 140 (i.e., the surface of membrane 140 exposed towards top side 196 of internal chamber 194). Gas 113 may be dispersed below membrane 140. As a result, gravity may draw liquid 109 downward across each of the membrane portions 142, 144, 146, 148, 150, 152, 154, 156, 158, 160, 162, 164, 166, 168 on the upper surface of membrane 140. Similarly, natural convection of gas 113 may drive gas 113 upward across each of the membrane portions

142, 144, 146, 148, 150, 152, 154, 156, 158, 160, 162, 164, 166, 168 on a lower surface of membrane 140 (i.e., the surface of membrane 140 exposed towards bottom side 198 of internal chamber 194 and located opposite the upper surface). The liquid 109 and the gas 113 may then meet at the membrane portions, so as to transfer carbon dioxide from the gas 113 to the liquid 109.

Membrane 140 may be permeable to both the liquid 109 and the gas 113. In this way, membrane 140 may provide an increased surface area for liquid 109 and gas 113 to meet— while also allowing gas 113 to pass through the membrane 140 so as to exit internal chamber 194 of apparatus 100 via an upper gas outlet 186. Similarly, membrane 140 may allow liquid 109 to spread out across the surface of membrane 140 (e.g., the upper surface) to provide increased surface area— yet also allow liquid 109 to pass through membrane 140 (e.g., to the opposite lower surface) in order to exit internal chamber 194 at a lower water outlet 188.

In this way, gas 113 may enter into apparatus 100 via lower gas inlet 184, pass through membrane 140, and then exit apparatus 100 via upper gas outlet 186. Liquid 109 is similarly routed from a liquid inlet (not shown in FIG. 1), through membrane 140, then out of apparatus 100 at lower liquid outlet 188. This configuration may allow the liquid 109 and the gas 113 to be driven from one location inside apparatus 100 without the use of powered machinery—but instead allow gravity, and/or convection due to temperature differences in the gas, to drive or initiate motion through apparatus 100.

Figure 2:
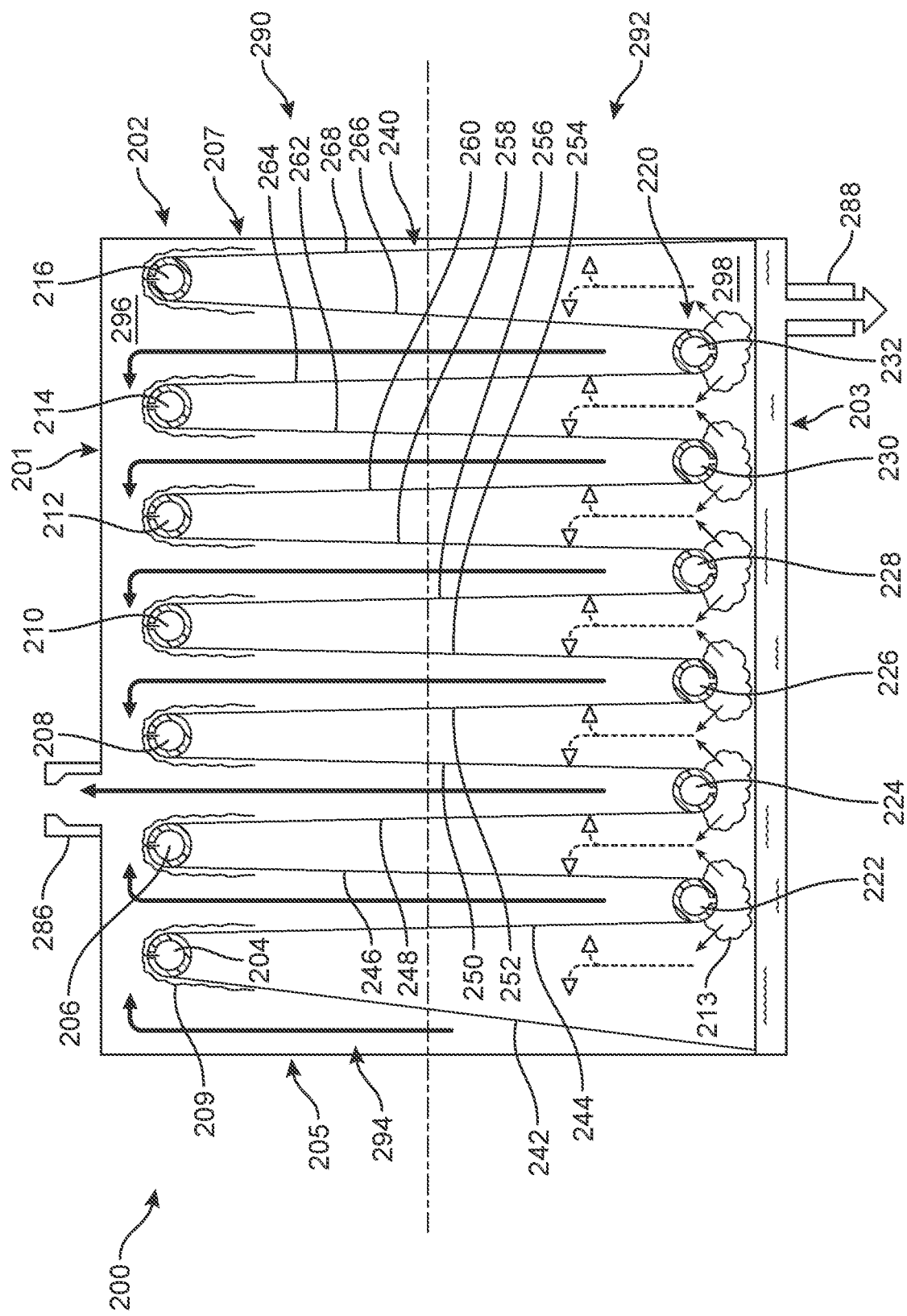
FIG. 2 is a cross-sectional diagram of a second embodiment of a gas exchange apparatus in accordance with this disclosure.

FIG. 2 shows a second embodiment of a gas exchange apparatus 200 in accordance with this disclosure. Apparatus 200 may be substantially similar to apparatus 100 shown in FIG. 1 with respect to some features, but may differ with respect to other features. Namely, in this embodiment, the gas feed mechanism and the lower rods (e.g., gas feed rods) may be combined together.

Specifically, apparatus 200 may include a plurality of water feed rods 202 that may be connected to an upper liquid inlet (not shown) that routes a liquid 209 through plurality of water feed rods 202 and out onto the top of a membrane 240, for example, onto the upper surface of membrane 240. Apparatus 200 may also include a plurality of gas feed rods 220 that may be connected to a lower gas inlet (not shown) that routes a gas 213 through plurality of gas feed rods 220 and out below membrane 240.

As with apparatus 100 shown in FIG. 1, in apparatus 200 shown in FIG. 2 plurality of water feed rods 202 may be located in an upper area 290 of an internal chamber 294 of apparatus 200. The plurality of gas feed rods 220 may then be located in a lower area 292 of internal chamber 294 of apparatus 200. In this way, the plurality of water feed rods 202 may each be located vertically above each of the plurality of gas feed rods 220.

In the specific embodiment shown in FIG. 2, apparatus 200 may include six lower gas feed rods (222, 224, 226, 228, 230, and 232). However, in general, a gas exchange apparatus in accordance with this disclosure may include any number of a plurality of lower gas feeds rods as may be suitable for creating an increased surface area to transfer carbon dioxide from gas 213 to liquid 209. In this embodiment, porous membrane 240 may extend over each of the plurality of upper water feed rods 202 and under each of the plurality of lower gas feed rods 220 in an alternating manner.

Namely, membrane 240 may extend upward at a membrane portion 242, over a first water feed rod 204 of plurality of water feed rods 202, back down along a membrane portion 244, under a first gas feed rod 222 of plurality of gas feed rods 220, upward at a membrane portion 246, over a second water feed rod 206, downward at a membrane portion 248, under a second gas feed rod 224, upward at a membrane portion 250, over a third water feed rod 208, downward at a membrane portion 252, under a third gas feed rod 226, upward at a membrane portion 254, over a fourth water feed rod 210, downward at a membrane portion 256, under a fourth gas feed rod 228, upward at a membrane portion 258, over a fifth water feed rod 212, downward at a membrane portion 260, under a fifth gas feed rod 230, upward at a membrane portion 262, over a sixth water feed rod 214, downward at a membrane portion 264, under a sixth gas feed rod 232, upward at a membrane portion 266, over a seventh water feed rod 216, and downward at a membrane portion 268.

In this embodiment, the various membrane portions 242, 244, 246, 248, 250, 252, 254, 256, 258, 260, 262, 264, 266, and 268 may all be continuous portions of one single membrane 240. As a result, a single membrane 240 can be used to provide increased surface area contact between the gas 213 and the liquid 209. The particular configuration shown in FIG. 2 may advantageously allow the structure that supports and aligns membrane 240 to also serve as the feed sources for the liquid 209 and the gas 213. This may allow apparatus 200 to use minimal additional structural materials (further reducing the carbon footprint to manufacture apparatus 200), as well as reducing the literal footprint size of apparatus 200 by packing together increased surface area within smaller total dimensions of apparatus 200.

FIG. 2 also shows a gas outlet 286 that is disposed on an upper area 290 of the internal chamber 294 of apparatus 200, on a top side 201 of apparatus 200. Gas outlet 286 may therefore be disposed vertically above the plurality of water feed rods 202. This may allow gas 213 to move vertically upward due to convection resulting from a temperature difference, and drive itself up and out of apparatus 200 after having mixed with liquid 209 at membrane 240 along the full surface of each diagonal membrane portion (e.g., one or more of membrane portions 242, 244, 246, 248, 250, 252, 254, 256, 258, 260, 262, 264, 266, and/or 268).

Similarly, FIG. 2 also shows a liquid outlet 288 that is disposed on a lower area 292 of the internal chamber 294 of apparatus 200, on a bottom side 203 of apparatus 200. Liquid outlet 288 may therefore be disposed vertically below the plurality of gas feed rods 220. This may allow liquid 209 to move vertically downward due to gravity, and drive itself down and out of apparatus 200 after having mixed with the gas 213 at membrane 240 along the full surface of each diagonal membrane portion (e.g., one or more of membrane portions 242, 244, 246, 248, 250, 252, 254, 256, 258, 260, 262, 264, 266, and/or 268).

In some embodiments, such as is shown in FIG. 2, a top side 296 of internal chamber 294 and a bottom side 298 of internal chamber 294 may be entirely sealed from each other by membrane 240. Namely, membrane 240 may be configured within internal chamber 294 such that membrane 240 extends all the way to each wall on the sides of internal chamber 294, including a first wall 205 and an opposite second wall 207. As a result, top side 296 and bottom side 298 of internal chamber 294 of apparatus 200 may be entirely physically separated by membrane 240—such that the gas 213 entering internal chamber 294 must pass through membrane 240 as it moves vertically upward from plurality of gas feed rods 220 to upper gas outlet 286. This configuration may prevent gas 213 from seeping around membrane 240, for example. This may advantageously ensure that all or substantially all of gas 213 exchanges carbon dioxide with liquid 209.

Membrane 240 may generally be any flexible substance that is permeable to both liquid 209 and gas 213 and that may provide increased surface area for the two to mix. Namely, membrane 240 may be sufficiently flexible to achieve the over-under alternating pattern discussed above while also allowing water or other liquid to spread out across the membrane through surface tension. Namely, membrane 240 may be any porous membrane with a pore size configured to allow water dispersion across the membrane by surface tension. The pore size therefore may not be too large, or else the water would travel directly through the membrane without dispersing across its surface—and may also not be too small or else the water would not permeate through the membrane at a rate sufficient to allow it to exit the apparatus 200 via lower liquid outlet 288 without undue pooling. In one particular embodiment, membrane 240 may comprise polyester and may have a mesh size of approximately 14×10 microns.

Figure 3:
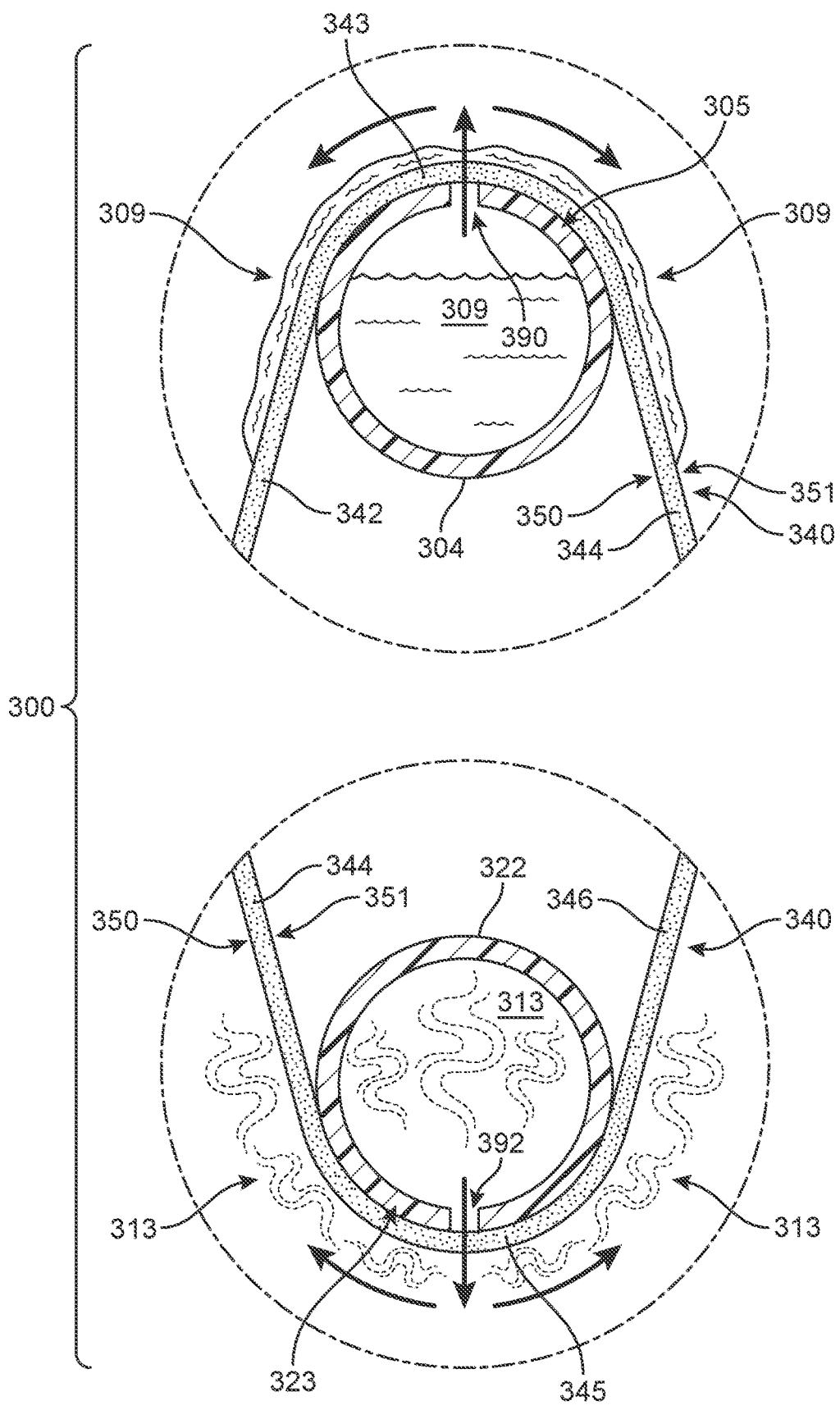
FIG. 3 is a cross-sectional diagram of further details of the second embodiment of a gas exchange apparatus in accordance with this disclosure.

Next, FIG. 3 shows additional detail of a representative one water feed rod 304 of the plurality of water feed rods (e.g., water feed rods 102, 202) and a representative one gas feed rod 322 of the plurality of gas feed rods (e.g., gas feed rods 120, 220). First, water feed rod 304 may be a hollow rod that holds and directs water 309. Water feed rod 304 may include a water outlet 309 on an upper side 305 thereof. Water outlet 309 may allow water 309 to exit water feed rod 304, pass through a porous membrane 340 from a lower surface 350 to an opposite upper surface 351, and then disperse along upper surface 351 of membrane 340 as shown. Namely, lower surface 350 of membrane 340 may be contiguous with upper side 305 of water feed rod 304. In this way, a membrane portion 342 of membrane 340 extends upward, then a membrane portion 343 of membrane 340 is contiguous with water feed rod 304, then a membrane portion 344 of membrane 340 extends downward vertically to a laterally adjacent gas feed rod 322. Accordingly, membrane 340 may wrap over water feed rod 304 for structural support while also allowing water feed rod 304 to disperse water 309 onto the membrane 340 (e.g., onto upper surface 351).

FIG. 3 also shows how gas feed rod 322 may include a gas outlet 392 on a lower side 323 of the gas feed rod 322. Gas feed rod 322 may be a hollow rod that contains and directs the flow of gas 313. Namely, gas feed rod 322 may direct the flow of gas 313 through outlet 392, through membrane 340 from upper surface 351 of membrane 340 to the opposite lower surface 350 of membrane 340, and then disperse along lower surface 350 of membrane 340 as it moves upward. Membrane 340 may extend downward at a membrane portion 344, around gas feed rod 322 at a membrane portion 345, and then extend back upward toward another laterally adjacent water feed rod at a membrane portion 346. In this same way as discussed above with respect to water feed rod 304, gas feed rod 322 may therefore provide structural support for membrane 340 while also acting as an outlet that spreads gas 313 appropriately for contact with liquid 309 to transfer or exchange carbon dioxide.

Figure 4:
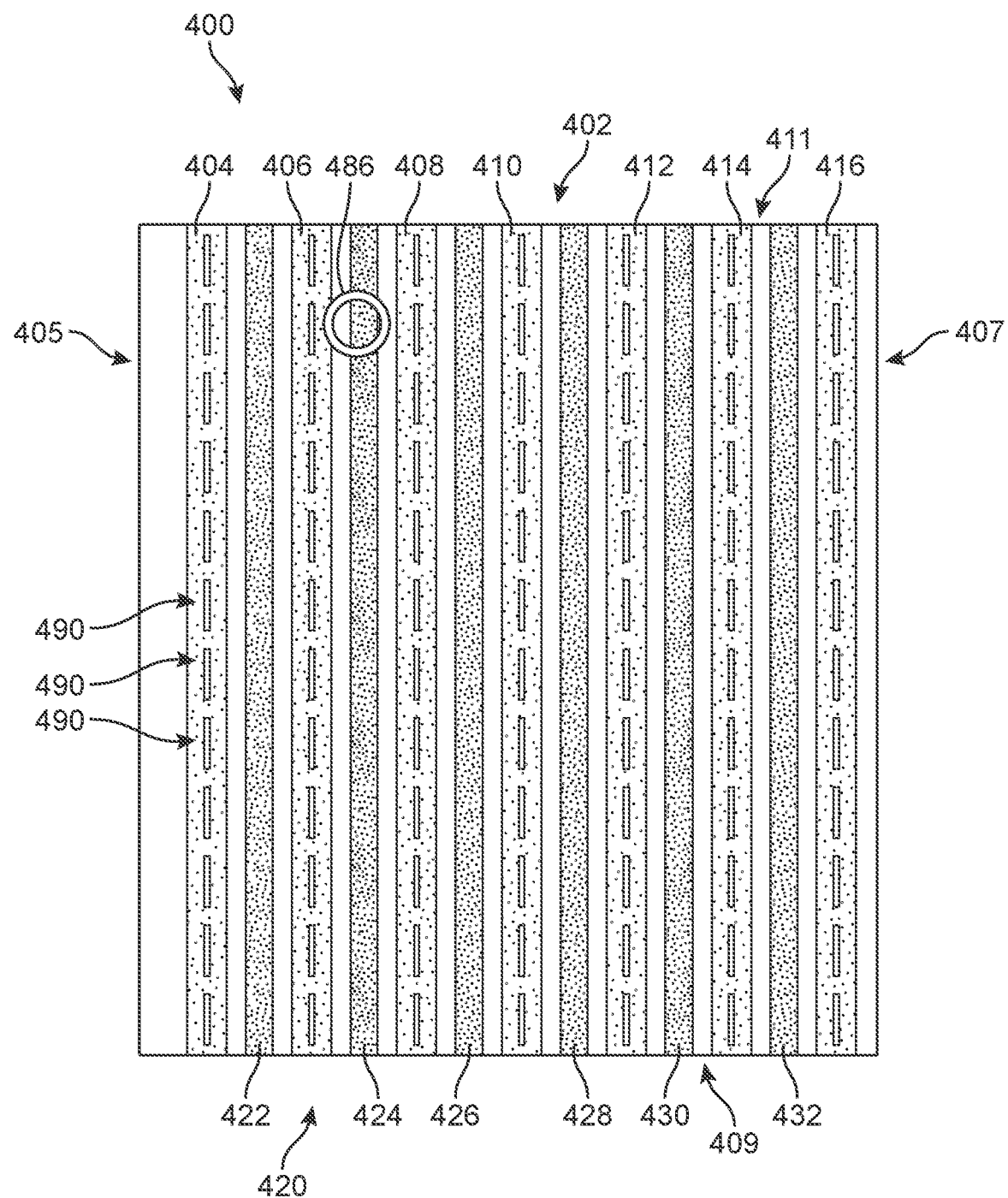
FIG. 4 is a top-view diagram of a gas exchange apparatus in accordance with this disclosure.

While FIGS. 1-3 all show various features of embodiments of gas exchange apparatuses from a front cross-sectional view, FIG. 4 instead shows a top cross-sectional view of a gas exchange apparatus 400. Namely, FIG. 4 shows a plurality of water feed rods 402 and a plurality of gas feed rods 420 as viewed from the top of apparatus 400—without a membrane shown in this cross-sectional view. FIG. 4 shows in particular how each of the plurality of water feed rods 402 extends horizontally across the internal chamber of apparatus 400 from a front side 409 to an opposite rear side 411. Furthermore, each water feed rod of the plurality of water feed rods 402 may be parallel to each of the other water feed rods of the plurality of water feed rods 402. They may also be parallel to walls on opposite sides of apparatus 400, for example, a first wall 405 on the left side and an opposite second wall 407 on the right side.

Each of the plurality of water feed rods may also include a plurality of water outlets 490 on an upper side thereof. Each of the plurality of water outlets 490 may correspond to outlet 390 as shown in FIG. 3. Moreover, in certain embodiments, the plurality of water outlets 490 may be configured to cause the water to spread out horizontally (from front side 409 to rear side 411) over the surface of the membrane (not shown in FIG. 4). In this way, the plurality of water outlets 490 may help ensure that the liquid covers as large a surface area of the membrane as possible, to most efficiently transfer carbon dioxide from the gas to the liquid.

FIG. 4 also shows how each of the plurality of gas feed rods (or lower rods, in the case of an embodiment such as apparatus 100 shown in FIG. 1) may also extend horizontally across the internal chamber of apparatus 400 from front side 409 to rear side 411. Each gas feed rod of the plurality of gas feed rods (or lower rods) 420 may also be oriented parallel to each of the other gas feed rods of the plurality of gas feed rods (or lower rods) 420. As a result of this configuration, all of the water feed rods 402 and all of the gas feed rods (or lower rods) 420 may all be parallel to each other. They may also all extend the length of the internal chamber of apparatus 400, from front side 409 to rear side 411.

As previously discussed above with respect to FIGS. 1 and 2, the plurality of water feed rods 402 may be spaced apart by a vertical distance from the plurality of gas feed rods (or lower rods) 420. Similarly, FIG. 4 shows how each of the plurality of water feed rods 402 may be laterally offset by a distance from each of the plurality of gas feed rods (or lower rods) 420. For example, first water feed rod 404 may be laterally (i.e., extending in a direction from first wall 405 on the left side to second wall 407 on the right side) offset from a first gas feed rod (or lower rod) 422. In the particular configuration shown in FIG. 4, each of the plurality of gas feed rods (or lower rods) 420 may be located laterally between two water feed rods. Namely, first gas feed rod (or lower rod) 422 may be located laterally between a first water feed rod 404 and a second water feed rod 406. This lateral offset may allow for the membrane to be threaded over-and-under the rods in an alternating manner, as discussed variously above.

Figure 5:
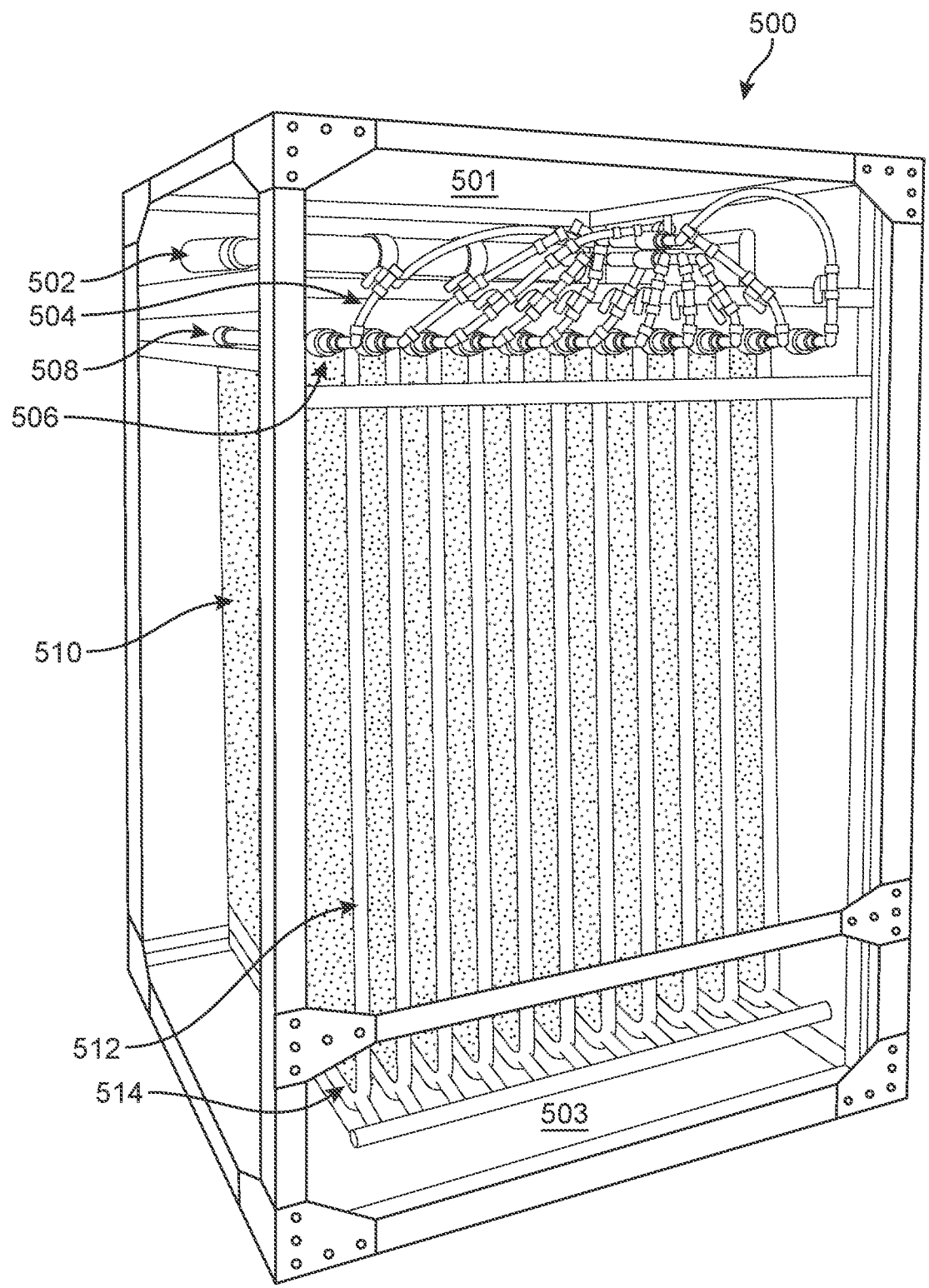
FIG. 5 is an isometric view diagram of a third embodiment of a gas exchange apparatus in accordance with this disclosure.

FIG. 5 shows a third embodiment of a gas exchange apparatus 500 in accordance with this disclosure. In particular, FIG. 5 shows an upper liquid inlet 502 in fluidic communication with a plurality of upper water feed rods 508 via tubing 504. A membrane 510 then extends vertically from a lower area 503 of apparatus 500 to an upper area 501 of apparatus 500, and also laterally, between plurality of upper water feed rods 508 and a plurality of gas feed rods 514. In this embodiment, structural supports 512 may hold upper water feed rods 508 aligned with lower gas feed rods 514.

Figure 6:
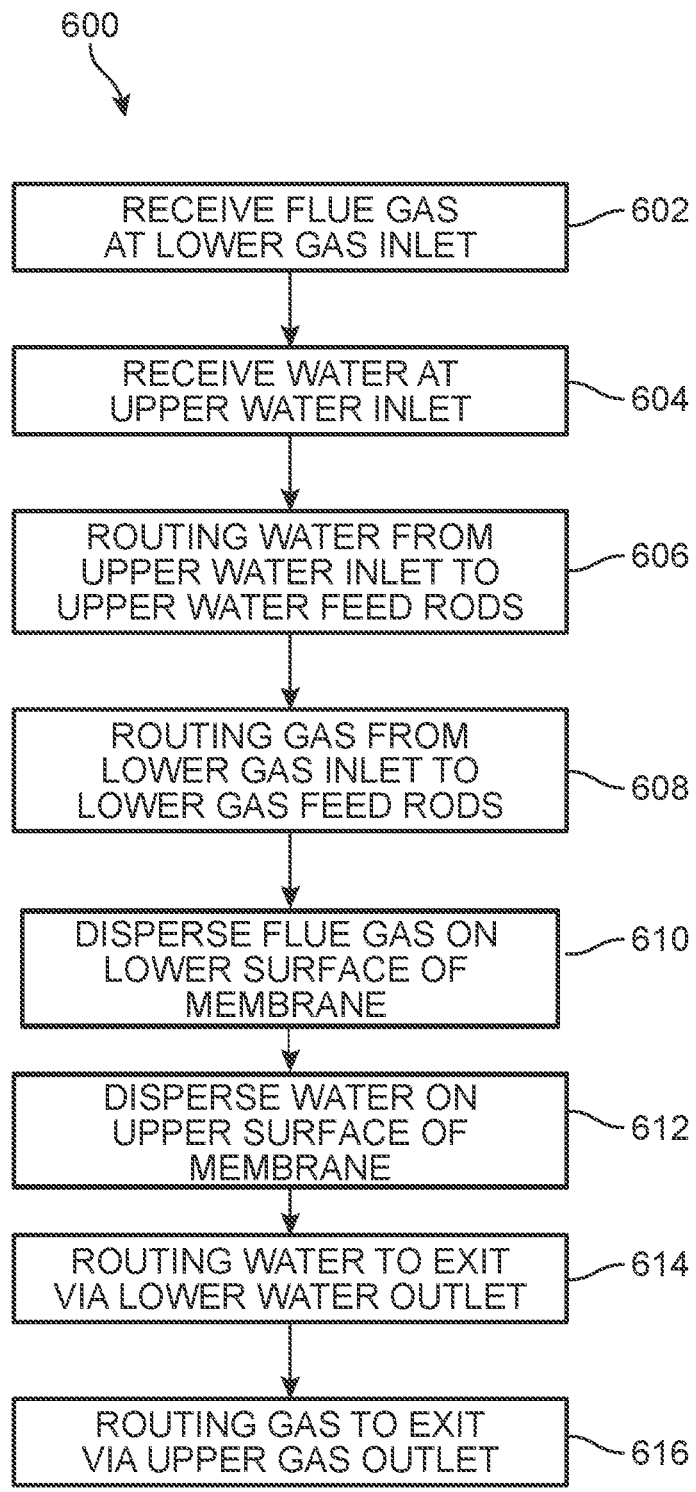
FIG. 6 is a flowchart showing a method of exchanging carbon dioxide from a flue gas to a water supply using a gas exchange apparatus in accordance with this disclosure.

Finally, FIG. 6 shows a flowchart of a method 600 of operating a gas exchange apparatus to exchange carbon dioxide from a flue gas to a water supply in accordance with the example embodiments described herein. This particular embodiment of a method of use shown in FIG. 6 may be used with embodiments of the apparatus such as is shown in FIGS. 2-5. Generally, the steps of method 600 are discussed in the order shown in FIG. 6, however a person of ordinary skill in the art may appreciate that certain method steps may be performed in other orders—and any such various orders of the steps are contemplated to be within the scope of this disclosure.

A first step 602 of method 600 may include receiving a flue gas at a lower gas inlet. The flue gas may be produced by a combustion process, such as industrial power generation. As discussed above, the lower gas inlet may be located in a lower area of the gas exchange apparatus. Next, or simultaneously with step 602, method 600 may include second step 604 of receiving water at an upper water inlet. As discussed above, the upper water inlet may be located in an upper area of the gas exchange apparatus.

Step 606 next may include routing the water from the upper water inlet to a plurality of upper water feed rods. As shown in FIG. 5, water may be routed from the inlet to the water feed rods by a variety of tubing. Similarly, step 608 of method 600 may include routing the gas from the lower gas inlet to a plurality of lower gas feed rods. Generally, step 606 may take place after step 602—and step 608 may take place after step 604—but steps 602 and 606 may take place in any order in relation to steps 604 and 608.

Next, step 610 may include dispersing the flue gas from the plurality of gas feed rods onto a lower surface of a porous membrane. Step 612 may similarly include dispersing the water from the plurality of water feed rods onto an upper surface of the porous membrane.

In step 614 the method 600 may include routing the water to exit the apparatus via a lower water outlet. The lower water outlet may be disposed in a lower area of the apparatus. Finally, in step 616 the method 600 may include routing the gas to exit the apparatus via an upper gas outlet, which may be located in an upper area of the apparatus.

Therefore, method 600 may allow a gas exchange apparatus to transfer carbon dioxide from the flue gas to the water under the power of only gravity and natural convection without the need for pumps, blowers, or other energy consuming devices. This may allow method 600 to be performed in a carbon neutral or carbon negative manner.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A gas exchange apparatus, comprising:
an upper liquid inlet, connected to a plurality of water feed rods located in an upper area of an internal chamber of the apparatus;
a lower gas inlet, connected to a gas feed mechanism located in a lower area of an internal chamber of the apparatus, wherein the gas feed mechanism includes a plurality of gas outlets configured to route gas from the lower gas inlet into the internal chamber of the apparatus;
a porous membrane separating a top side of the internal chamber of the apparatus from a bottom side of the internal chamber of the apparatus;

wherein the plurality of water feed rods are located vertically above the gas feed mechanism and above a plurality of lower rods; and
wherein the porous membrane extends over each of the plurality of water feed rods and under each of the plurality of lower rods in an alternating pattern, such that each water feed rod is located on the bottom side of the internal chamber of the apparatus and each lower rod is located on the top side of the internal chamber of the apparatus.

2. The gas exchange apparatus according to claim 1, wherein
each of the plurality of water feed rods extends horizontally across the internal chamber of the apparatus, and is oriented parallel to each of the other of the plurality of water feed rods.

3. The gas exchange apparatus according to claim 1, wherein
each of the plurality of water feed rods includes a water outlet on an upper side of the water feed rod, the water outlet being configured to disperse a liquid onto an upper surface of the porous membrane.

4. The gas exchange apparatus according to claim 1, wherein
each of the plurality of lower rods extends horizontally across the internal chamber of the apparatus, and is oriented parallel to each of the other of the plurality of lower rods.

5. The gas exchange apparatus according to claim 1, wherein the porous membrane is configured within the internal chamber such that:
a lower surface of the membrane is contiguous with an upper side of a first water feed rod,
the membrane extends downward diagonally from the first water feed rod to a laterally adjacent first lower rod,
an upper surface of the membrane is contiguous with a lower side of the first lower rod, and
the membrane extends upward diagonally from the first lower rod to a laterally adjacent second water feed rod;
thereby forming a plurality of diagonal membrane surfaces that provide increased surface area for a liquid and a gas to come into contact.

6. The gas exchange apparatus according to claim 1, further comprising
a lower liquid outlet, configured to allow a liquid to exit from the lower area of the internal chamber of the apparatus; and
an upper gas outlet, configured to allow a gas to exit from the upper area of the internal chamber of the apparatus.

7. The gas exchange apparatus according to claim 1, wherein the porous membrane has a pore size configured to allow water dispersion across the porous membrane by surface tension.

8. A gas exchange apparatus comprising:
an upper liquid inlet, connected to a plurality of water feed rods located in an upper area of an internal chamber of the apparatus;
a lower gas inlet, connected to a plurality of gas feed rods located in a lower area of the internal chamber of the apparatus;
a porous membrane separating a top side of the internal chamber of the apparatus from a bottom side of the internal chamber of the apparatus;
a lower liquid outlet, configured to allow a liquid to exit from the lower area of the internal chamber of the apparatus; and an upper gas outlet, configured to allow a gas to exit from the upper area of the internal chamber of the apparatus;

wherein the porous membrane extends over each of the plurality of water feed rods and under each of the plurality of gas feed rods in an alternating pattern, such that each water feed rod is located on the bottom side of the internal chamber of the apparatus and each gas feed rod is located on the top side of the internal chamber of the apparatus;

each of the plurality of water feed rods includes a water outlet on an upper side of the water feed rod, the water outlet being configured to disperse a liquid onto an upper surface of the porous membrane; and each of the plurality of gas feed rods includes a gas outlet on a lower side of the gas feed rod, the gas outlet being configured to disperse a gas onto a lower surface of the porous membrane.

9. The gas exchange apparatus according to claim 8, wherein the porous membrane comprises polyester and has a mesh size of 14×10 microns.

10. The gas exchange apparatus according to claim 8, wherein the top side of the internal chamber and the bottom side of the internal chamber are physically separated from each other by the porous membrane, such that a gas entering the internal chamber of the apparatus must pass through the porous membrane as it moves vertically upward from the plurality of gas feed rods to the upper gas outlet.

11. The gas exchange apparatus according to claim 8, wherein each of the plurality of water feed rods extends horizontally across the internal chamber of the apparatus, and is oriented parallel to each of the other of the plurality of water feeds rods;

each of the plurality of the gas feed rods extends horizontally across the internal chamber of the apparatus, and is oriented parallel to each of the other of the plurality of gas feeds rods; and each of the plurality of the gas feed rods is located lower within the internal chamber of the apparatus than each of the plurality of water feed rods, and each of the plurality of the gas feed rods is located laterally between two water feed rods.

12. The gas exchange apparatus according to claim 8, wherein the porous membrane extends diagonally downward from each of the plurality of water feed rods to a laterally adjacent gas feed rod, thereby forming a plurality of diagonal membrane surfaces that provide increased surface area for a liquid and a gas to come into contact.

13. The gas exchange apparatus according to claim 8, wherein the porous membrane comprises polyester and has a mesh size of 14×10 microns.

14. A method of exchanging carbon dioxide from a flue gas to a water supply using a gas exchange apparatus, comprising:

receiving a flue gas into the gas exchange apparatus through a lower gas inlet;

receiving a water supply into the gas exchange apparatus through an upper liquid inlet;

routing the water from the upper liquid inlet to a plurality of water feed rods located in an upper area of an internal chamber of the gas exchange apparatus;

routing the flue gas from the lower gas inlet to a plurality of gas feed rods located in a lower area of the internal chamber of the gas exchange apparatus;

dispersing the flue gas from the plurality of gas feed rods onto a lower surface of a porous membrane;

dispersing the water from the plurality of water feed rods onto an upper surface of the porous membrane; and wherein the porous membrane extends over each of the plurality of water feed rods and under each of the plurality of gas feed rods in an alternating pattern so as to divide the internal chamber into a top side and a bottom side.

15. The method according to claim 14, wherein the plurality of water feed rods and the porous membrane are configured within the gas exchange apparatus such that gravity draws the water downward vertically across the porous membrane while surface tension of the water causes the water to spread out horizontally over the upper surface of the porous membrane.

16. The method according to claim 14, wherein the plurality of water feed rods and the porous membrane are configured within the gas exchange apparatus such that convection moves the flue gas upward vertically across the porous membrane, thereby mixing with water on the porous membrane.

17. The method according to claim 15, wherein the method further comprises routing the water to exit the gas exchange apparatus via a lower water outlet, the lower water outlet being disposed vertically below the plurality of gas feed rods.

18. The method according to claim 15, wherein the method further comprises routing the flue gas to exit the gas exchange apparatus via an upper gas outlet, the upper gas outlet being disposed vertically above the plurality of water feed rods.

19. The method according to claim 15, wherein the porous membrane has a pore size configured to allow water dispersion across the porous membrane by surface tension.

20. The method according to claim 15, wherein the porous membrane comprises polyester and has a mesh size of 14×10 microns.

* * * * *